United States Patent
Kobayashi et al.

(10) Patent No.: US 9,646,773 B2
(45) Date of Patent: May 9, 2017

(54) ELECTROLYTE SOLUTION FOR CAPACITORS, ELECTRIC DOUBLE LAYER CAPACITOR, AND LITHIUM ION CAPACITOR

(71) Applicant: SUMITOMO SEIKA CHEMICALS CO., LTD., Hyogo (JP)

(72) Inventors: Kazuyuki Kobayashi, Hyogo (JP); Noriko Yamamoto, Hyogo (JP)

(73) Assignee: Sumitomo Seika Chemicals Co., Ltd., Hyogo (JP)

(*) Notice: Subject to any disclaimer, the term of this patent is extended or adjusted under 35 U.S.C. 154(b) by 37 days.

(21) Appl. No.: 14/387,766

(22) PCT Filed: Mar. 6, 2013

(86) PCT No.: PCT/JP2013/056099
§ 371 (c)(1),
(2) Date: Sep. 24, 2014

(87) PCT Pub. No.: WO2013/146136
PCT Pub. Date: Oct. 3, 2013

(65) Prior Publication Data
US 2015/0049418 A1 Feb. 19, 2015

(30) Foreign Application Priority Data

Mar. 27, 2012 (JP) ................. 2012-072144

(51) Int. Cl.
*H01G 11/54* (2013.01)
*H01G 11/62* (2013.01)
*H01G 11/60* (2013.01)
*H01G 11/00* (2013.01)

(52) U.S. Cl.
CPC ............ *H01G 11/62* (2013.01); *H01G 11/00* (2013.01); *H01G 11/60* (2013.01); *H01G 11/54* (2013.01); *Y02E 60/13* (2013.01)

(58) Field of Classification Search
CPC ......... H01G 11/62; H01G 11/60; H01G 11/00
See application file for complete search history.

(56) References Cited

U.S. PATENT DOCUMENTS 7,026,075 B2 * 4/2006 Takami ............... H01M 4/381
429/207
2008/0192407 A1 8/2008 Lu et al.

FOREIGN PATENT DOCUMENTS

| CN | 1252853 C | 4/2006 |
|---|---|---|
| JP | 07-074061 | 3/1995 |
| JP | 10-027623 | 1/1998 |
| JP | 2000-114105 | 4/2000 |
| JP | 2008-171902 | 7/2008 |
| JP | 2008-277401 A | 11/2008 |
| JP | 2010-235526 A | 10/2010 |
| JP | 2010-258333 | * 11/2010 |
| JP | 2010-272610 | * 12/2010 |
| JP | 2011-023330 | 2/2011 |
| WO | WO 2008/059990 | 5/2008 |

* cited by examiner

Primary Examiner — Carol M Koslow
(74) Attorney, Agent, or Firm — Hamre, Schumann, Mueller & Larson, P.C.

(57) ABSTRACT

The present invention provides a highly conductive, highly voltage-resistant, and stable liquid electrolyte solution for capacitors which does not coagulate and is free from precipitation of salts in a wide temperature range, particularly at low temperatures, shows excellent electrical characteristics, and has excellent long-term reliability. The present invention also provides an electric double-layer capacitor and a lithium ion capacitor produced using the electrolyte solution for capacitors. The present invention relates to an electrolyte solution for capacitors including: an organic solvent; and a quaternary ammonium salt or lithium salt dissolved in the organic solvent, the organic solvent containing acetonitrile and a chain alkyl sulfonic compound represented by the formula (1):

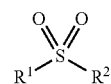

(1)

wherein $R^1$ and $R^2$, which may be the same as or different from each other, each independently represent a straight or branched chain C1-C4 alkyl group.

2 Claims, No Drawings

ELECTROLYTE SOLUTION FOR CAPACITORS, ELECTRIC DOUBLE LAYER CAPACITOR, AND LITHIUM ION CAPACITOR

TECHNICAL FIELD

The present invention relates to an electrolyte solution for capacitors. More specifically, the present invention relates to an electrolyte solution for capacitors for electric double-layer capacitors or lithium ion capacitors that provide high performance even at low temperatures.

BACKGROUND ART

Electric double-layer capacitors and lithium ion capacitors are used as small power sources for semiconductor memory backup and the like. These capacitors, however, have problems such that in cases where polarizing electrodes made from cheap porous carbon materials such as activated carbon are used, application of such a high voltage that exceeds the decomposition voltage of an electrolyte solution may cause an increase in internal resistance or a decrease in electrostatic capacity.

Therefore, electrolyte solutions used for electric double-layer capacitors or lithium ion capacitors are required to have high conductivity and high electrochemical stability. In addition, it is important for electrolyte solutions used for these capacitors, which are possibly used under unforgiving conditions, to have characteristics of keeping the capacitors stably active for a long time in a wide temperature range of from low temperatures to high temperatures.

Patent Literature 1 discloses an electrolyte solution for electric double-layer capacitors prepared by dissolving tetraethylammonium tetrafluoroborate, which is an aliphatic quaternary ammonium salt, as an electrolyte in propylene carbonate as an organic solvent.

However, in the electrolyte solution containing propylene carbonate as a solvent, the solvent begins to decompose at an applied voltage of 2.6 to 2.8 V. Therefore, the maximum voltage to be applied to an electric double-layer capacitor using this electrolyte solution is around 2.5 V. Thus, such a capacitor is problematically insufficient in withstand voltage.

Patent Literature 2 discloses an electrolyte solution using a mixture of sulfolane and 3-methylsulfolane or a mixture of sulfolane and 2,4-dimethylsulfolane as an organic solvent in order to increase a withstand voltage.

However, sulfolane has a melting point of 29° C., 3-methylsulfolane has a melting point of 1° C., and 2,4-dimethylsulfolane has a melting point of −3° C. Their melting points are relatively high. Therefore, the electrolyte solution coagulates at low temperatures to significantly deteriorate the characteristics of the capacitor.

Patent Literature 3 discloses the use of an electrolyte solution prepared by dissolving a quaternary onium salt in a solvent that contains 15 to 85% by volume of sulfolane or its derivative and 85 to 15% by volume of ethyl methyl carbonate as a chain carbonate ester, in an organic electrolyte cell including an electrode made of an organic semiconductor material having a polyacene skeleton.

This method, however, has a problem that ethyl methyl carbonate, which has poorer oxidation resistance than sulfolane, has remarkable influence to reduce the withstand voltage of the electrolyte solution.

Patent Literature 4 discloses the use of an electrolyte solution, in an electric double-layer capacitor, prepared by dissolving a quaternary ammonium salt such as spiro-(1,1')-pyrrolidinium tetrafluoroborate in an organic solvent which is a mixture of sulfolane and a chain alkyl sulfone compound mixed in a ratio of 70:30 to 90:10.

However, this electrolyte solution may coagulate at extremely low temperatures, and is not satisfactory in view of long-term reliability.

CITATION LIST

Patent Literature

Patent Literature 1: JP 2000-114105 A
Patent Literature 2: JP H7-74061 A
Patent Literature 3: JP H10-27623 A
Patent Literature 4: JP 2008-171902 A

SUMMARY OF INVENTION

Technical Problem

The present invention aims to provide a highly conductive, highly voltage-resistant, and stable liquid electrolyte solution for capacitors which does not coagulate and is free from precipitation of salts in a wide temperature range, particularly at low temperatures, shows excellent electrical characteristics, and has excellent long-term reliability. The present invention also aims to provide an electric double-layer capacitor and a lithium ion capacitor produced using the electrolyte solution for capacitors.

Solution to Problem

The present invention relates to an electrolyte solution for capacitors including: an organic solvent; and a quaternary ammonium salt or lithium salt dissolved in the organic solvent, the organic solvent containing acetonitrile and a chain alkyl sulfone compound represented by the formula (1):

(1)

wherein $R^1$ and $R^2$, which may be the same as or different from each other, each independently represent a straight or branched chain C1-C4 alkyl group.

The present invention is described in more detail below.

The present inventors have made intensive studies to find that a quaternary ammonium salt or lithium salt is dissolved in an organic solvent including a specific chain alkyl sulfone compound and acetonitrile to give a highly conductive, highly voltage-resistant, and electrolyte solution for capacitors which is stable in the liquid form, does not coagulate, and is free from precipitation of salts in a wide temperature range, particularly at low temperatures, shows excellent electrical characteristics, and has excellent long-term reliability. Thus, the present invention has been completed.

The electrolyte solution for capacitors of the present invention is an electrolyte solution containing an organic solvent and a quaternary ammonium salt or lithium salt dissolved in the organic solvent.

The organic solvent contains a chain alkyl sulfone compound represented by the formula (1) (hereinafter, also referred to as chain alkyl sulfone compound). Use of the chain alkyl sulfone compound provides a stable electrolyte solution for capacitors of the present invention with a wide potential window. Further, use of the chain alkyl sulfone compound improves the long-term reliability of the capacitor.

In the formula (1), $R^1$ and $R^2$, which may be the same as or different from each other, each independently represent a straight or branched chain C1-C4 alkyl group. In terms of lowering the melting point, $R^1$ and $R^2$ are preferably different from each other. If $R^1$ and/or $R^2$ have 5 or more carbon atoms, the chain alkyl sulfone compound is solid at room temperatures, and an electrolyte solution for capacitors to be obtained significantly becomes highly viscous, resulting in deterioration of the characteristics of the capacitor, such as conductivity and electrostatic capacity. In addition, $R^1$ and/or $R^2$ having many carbon atoms tend to reduce the permittivity to decrease the solubility of an electrolyte. Therefore, the number of carbon atoms of each of $R^1$ and $R^2$ is preferably not more than 3. Further, in order to lower the crystallinity and lower the melting point, $R^1$ and $R^2$ are preferably a branched chain group.

For the high heat resistance or high durability of the capacitor, the boiling point of the chain alkyl sulfone compound is preferably not less than 240° C.

For the stable operation guarantee of the capacitor at low temperatures, the melting point of the chain alkyl sulfone compound is preferably not more than 0° C.

The lower the viscosity of the chain alkyl sulfone compound is, the more the internal resistance of the device is reduced. The viscosity measured at 25° C. is preferably not more than 10 cP. The viscosity herein means a value measured with a cone-and-plate rotational viscometer.

Specific examples of the chain alkyl sulfone compound include dimethyl sulfone, ethyl methyl sulfone, diethyl sulfone, propyl methyl sulfone, isopropyl methyl sulfone, propyl ethyl sulfone, isopropyl ethyl sulfone, dipropyl sulfone, and diisopropyl sulfone. These chain alkyl sulfone compounds may be used alone or two or more of these may be used in combination. The combination use of two or more of these chain alkyl sulfone compounds lowers the coagulation point of the electrolyte solution for capacitors to be obtained or improves the solubility of a quaternary ammonium salt or lithium salt.

The organic solvent contains acetonitrile. Use of acetonitrile gives an electrolyte solution for capacitors of the present invention having high conductivity at low temperatures.

The lower limit of the acetonitrile content of the organic solvent is preferably 5% by mass, and the upper limit thereof is preferably 80% by mass. If the acetonitrile content is less than 5% by mass, the obtained electrolyte solution for capacitors may coagulate or salts may precipitate in the electrolyte solution at low temperatures. If the acetonitrile content is more than 80% by mass, a highly volatile and highly toxic electrolyte solution for capacitors is obtained, which may be difficult to handle. The lower limit of the acetonitrile content is more preferably 10% by mass and still more preferably 20% by mass. The upper limit thereof is more preferably 50% by mass and still more preferably 30% by mass.

The lower limit of the amount of the acetonitrile is preferably 5 parts by mass, and the upper limit thereof is preferably 400 parts by mass, for 100 parts by mass of the chain alkyl sulfone compound. If the amount of the acetonitrile is less than 5 parts by mass for 100 parts by mass of the chain alkyl sulfone compound, the obtained electrolyte solution for capacitors may coagulate, or salts may precipitate in the electrolyte solution, at low temperatures. If the amount of the acetonitrile is more than 400 parts by mass for 100 parts by mass of the chain alkyl sulfone compound, a highly volatile electrolyte solution for capacitors, which may be difficult to handle, is obtained. The lower limit of the amount of the acetonitrile is more preferably 11 parts by mass, and the upper limit thereof is more preferably 100 parts by mass, for 100 parts by mass of the chain alkyl sulfone compound.

The organic solvent may contain an additional organic solvent as well as the chain alkyl sulfone compound and the acetonitrile. Examples of the additional organic solvent include sulfolane represented by the formula (2) (hereinafter, also referred to as sulfolane), 3-methylsulfolane, γ-butyrolactone, propylene carbonate, ethylene carbonate, vinylene carbonate, and butylene carbonate. In particular, sulfolane is preferably contained. Since the sulfolane is more inexpensive than the chain alkyl sulfone compound, addition of the sulfolane reduces the production cost of the electrolyte solution for capacitors of the present invention. Further, since the sulfolane has a higher withstand voltage than the carbonate esters listed above, a solvent mixture can be prepared without impairing high withstand voltage characteristics of the chain alkyl sulfones. Further, the solvent mixture of the sulfolane and the chain alkyl sulfone well dissolves the electrolyte.

(2)

The lower limit of the sulfolane content of the organic solvent is preferably 10% by mass, and the upper limit thereof is preferably 90% by mass. If the sulfolane content is less than 10% by mass, the electrolyte may become less soluble. If the sulfolane content is more than 90% by mass, the coagulation point of the electrolyte solution may rise. The lower limit of the sulfolane content is more preferably 20% by mass, and the upper limit thereof is more preferably 80% by mass.

The lower limit of the amount of the sulfolane is preferably 11 parts by mass, and the upper limit thereof is preferably 900 parts by mass, for 100 parts by mass of the chain alkyl sulfone compound. If the amount of the sulfolane is less than 11 parts by mass for 100 parts by mass of the chain alkyl sulfone compound, the electrolyte may become less soluble. If the amount of the sulfolane is more than 900 parts by mass for 100 parts by mass of the chain alkyl sulfone compound, the coagulation point of the electrolyte solution may rise. The lower limit of the amount of the sulfolane is more preferably 25 parts by mass, and the upper limit thereof is more preferably 400 parts by mass, for 100 parts by mass of the chain alkyl sulfone compound.

The electrolyte in the electrolyte solution for capacitors of the present invention is a quaternary ammonium salt or lithium salt.

Examples of the quaternary ammonium salt include salts of anion and tetraalkylammonium such as triethylmethylammonium, tetraethylammonium, tetrabutylammonium, diethyldimethylammonium, ethyltrimethylammonium, dimethylpyrrolidinium, diethylpyrrolidinium, ethylmethylpyrrolidinium, spiro-(1,1')-pyrrolidinium, N-methyl-N-spiro [pyrrolidinium], diethylpiperidinium, and spiro-(1,1')-piperidinium.

Preferred examples of the anion forming the quaternary ammonium salt or lithium salt include $BF_4^-$, $PF_6^-$, $CF_3SO_3^-$, $N(CF_3SO_2)_2^-$, $N(C_2F_5SO_2)_2^-$, $N(CF_3SO_2)(C_4F_9SO_2)_2^-$, $C(CF_3SO_2)_3^-$, and $C(C_2F_5)_3^-$. In particular, more preferred are $BF_4^-$, $PF_6^-$, and $N(CF_3SO_2)_2^-$ because they are highly soluble in the organic solvent and are electrochemically stable, and provide an electrolyte solution with high conductivity. Still more preferred are $BF_4^-$ and $PF_6^-$. These anions may be used alone, or two or more of these may be used in combination.

In particular, triethylmethylammonium tetrafluoroborate is preferred as the quaternary ammonium salt, and $LiPF_6$ is preferred as the lithium salt.

The lower limit of the concentration of the quaternary ammonium salt or lithium salt in the electrolyte solution for capacitors of the present invention is preferably 0.1 mol/L, and the upper limit thereof is preferably 3.0 mol/L. If the concentration of the quaternary ammonium salt or lithium salt is less than 0.1 mol/L, the conductivity may be insufficient. If the concentration of the quaternary ammonium salt or lithium salt is more than 3.0 mol/L, the obtained electrolyte solution for capacitors is highly viscous and is poor in impregnating ability, which may impair the electrical characteristics of the capacitor. The lower limit of the concentration of the quaternary ammonium salt or lithium salt is more preferably 0.5 mol/L and still more preferably 0.8 mol/L, and the upper limit thereof is more preferably 2.0 mol/L and still more preferably 1.5 mol/L.

The electrolyte solution for capacitors of the present invention may contain an additive that imparts an impregnating ability or fire retardancy. Specific examples of the additive include siloxane compounds such as hexamethyldisiloxane and hexamethylcyclotrisiloxane.

The electrolyte solution for capacitors of the present invention can be prepared by the following production method.

Specifically, the electrolyte composed of the quaternary ammonium salt or lithium salt is added to the organic solvent, and the solution is stirred to completely dissolve the electrolyte. The obtained electrolyte solution is dehydrated to reduce the water content of the electrolyte solution to not more than 100 ppm, and preferably not more than 20 ppm. Thus, an intended electrolyte solution for capacitors is obtained.

The capacitor is formed using the thus prepared electrolyte solution for capacitors. The present invention also relates to an electric double-layer capacitor and a lithium ion capacitor produced using the electrolyte solution for capacitors of the present invention. Hereinafter, both the electric double-layer capacitor of the present invention and the lithium ion capacitor of the present invention are also referred to as a capacitor of the present invention.

The electric double-layer capacitor of the present invention is produced by a usual method for producing capacitors. That is, the capacitor is formed in such a way that polarizing electrodes between which a separator is disposed are impregnated with the electrolyte solution for capacitors of the present invention serving as a driving electrolyte solution, and these are sealed in a container.

The lithium ion capacitor can also be formed by a usual method for producing lithium ion capacitors. That is, a polarizing electrode (cathode) and a carbon electrode (anode) capable of occluding and releasing lithium ions are separated by a separator, and are impregnated with the electrolyte solution for capacitors of the present invention serving as a driving electrolyte solution, and these are sealed in a container.

Examples of the polarizing electrode include porous carbon materials such as activated carbon powder and activated carbon fibers, metal oxide materials, and conductive polymer materials. In particular, porous carbon materials are preferred because they are readily available at low cost.

Examples of the carbon electrode capable of occluding and releasing lithium ions include materials such as hard carbon, graphite, and carbon nanotube. In particular, the graphite material, which is used as an anode of lithium-ion batteries, is preferred due to its readily availability. The graphite material is used for a lithium ion capacitor after doping with lithium ions.

The separator may be made of a material such as cellulose, polyethylene, or polypropylene unwoven fabric.

The capacitor of the present invention may be in any form, and, for example, in the form of a film, coin, cylinder, or box.

Advantageous Effects of Invention

The present invention provides a highly conductive, highly voltage-resistant, and stable liquid electrolyte solution for capacitors which does not coagulate and is free from precipitation of salts in a wide temperature range, particularly at low temperatures, shows excellent electrical characteristics, and has excellent long-term reliability. In addition, the present invention provides an electric double-layer capacitor and a lithium ion capacitor produced using the electrolyte solution for capacitors.

DESCRIPTION OF EMBODIMENTS

The present invention is explained in more detail below based on examples, but is not limited to these examples.

Table 1 shows formulas of chain alkyl sulfone compounds ("ethyl methyl sulfone", "ethyl isopropyl sulfone", "ethyl isobutyl sulfone"), a cyclic sulfone compound ("sulfolane"), a chain nitrile compound ("acetonitrile"), and a carbonate ester compound ("propylene carbonate"), used as a solvent in examples and comparative examples.

TABLE 1

| | Compound name | Formula |
|---|---|---|
| Chain alkyl sulfone compound represented by formula (1) | Ethyl methyl sulfone (EMS) | 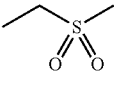 |
| | Ethyl isopropyl sulfone (EIPS) | 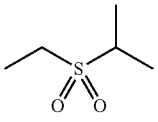 |
| | Ethyl isobutyl sulfone (EIBS) | 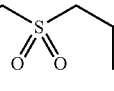 |
| Cyclic sulfone compound | Sulfolane | 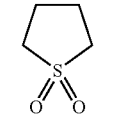 |

TABLE 1-continued

| | Compound name | Formula |
|---|---|---|
| Chain nitrile compound | Acetonitrile | |
| Carbonate ester compound | Propylene carbonate | |

EXAMPLE 1

Ethyl methyl sulfone (EMS, boiling point 239° C., melting point 34° C., viscosity 6 cP (35° C.)) (80 parts by mass) and acetonitrile (20 parts by mass) were placed in a glass screw vial and mixed to prepare a solvent in a dry box under an argon atmosphere in which the dew point was controlled to not more than −50° C. To the solvent was added triethylmethylammonium tetrafluoroborate to a concentration of 1.0 mol/L with a stirring bar. The screw vial was then sealed. The content was stirred for about 1 hour to completely dissolve the electrolyte using a magnetic stirrer. Thus, an electrolyte solution for capacitors was prepared. The moisture value of the prepared electrolyte solution for capacitors was measured using a Karl Fischer moisture meter (produced by Hiranuma Sangyo Corporation, "AQ-2200"), and was determined as less than 100 ppm.

EXAMPLE 2

Ethyl isopropyl sulfone (EIPS, boiling point 265° C., melting point −11° C., viscosity 6 cP (25° C.)) (16 parts by mass), sulfolane (64 parts by mass), and acetonitrile (20 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 3

Ethyl methyl sulfone (18 parts by mass), sulfolane (72 parts by mass), and acetonitrile (10 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 4

Ethyl methyl sulfone (20 parts by mass), sulfolane (60 parts by mass), and acetonitrile (20 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 5

Ethyl methyl sulfone (60 parts by mass), ethyl isopropyl sulfone (20 parts by mass), and acetonitrile (20 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 6

Ethyl methyl sulfone (70 parts by mass) and acetonitrile (30 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 7

Ethyl isopropyl sulfone (70 parts by mass) and acetonitrile (30 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 8

Ethyl isobutyl sulfone (EIBS, boiling point 261° C., melting point −16° C., viscosity 4 cP (25° C.)) (70 parts by mass) and acetonitrile (30 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 9

Ethyl isopropyl sulfone (95 parts by mass) and acetonitrile (5 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

EXAMPLE 10

Ethyl isopropyl sulfone (20 parts by mass) and acetonitrile (80 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

COMPARATIVE EXAMPLE 1

Triethylmethylammonium tetrafluoroborate was added to acetonitrile to a concentration of 1.0 mol/L. Thus, an electrolyte solution for capacitors was prepared. The moisture value of the prepared electrolyte solution for capacitors was determined as less than 100 ppm.

The electrolyte solution for capacitors obtained in Comparative Example 1 was highly volatile, and therefore needed to be used and stored at a temperature of 25° C. or lower for suppression of volatilization.

COMPARATIVE EXAMPLE 2

Triethylmethylammonium tetrafluoroborate was added to ethyl methyl sulfone to a concentration of 1.0 mol/L. Thus, an electrolyte solution for capacitors was prepared. The moisture value of the prepared electrolyte solution for capacitors was determined as less than 100 ppm.

COMPARATIVE EXAMPLE 3

Triethylmethylammonium tetrafluoroborate was added to propylene carbonate to a concentration of 1.0 mol/L. Thus, an electrolyte solution for capacitors was prepared. The moisture value of the prepared electrolyte solution for capacitors was determined as less than 100 ppm.

COMPARATIVE EXAMPLE 4

Triethylmethylammonium tetrafluoroborate was added to sulfolane to a concentration of 1.0 mol/L. Thus, an electrolyte solution for capacitors was prepared. The moisture value of the prepared electrolyte solution for capacitors was determined as less than 100 ppm.

COMPARATIVE EXAMPLE 5

Ethyl isopropyl sulfone (80 parts by mass) and sulfolane (20 parts by mass) were mixed to prepare a solvent. To the solvent was added triethylmethylammonium tetrafluoroborate to a concentration of 1.0 mol/L. Thus, an electrolyte solution for capacitors was prepared. The moisture value of the prepared electrolyte solution for capacitors was determined as less than 100 ppm.

<Evaluation>
(1) Measurement of Properties of Electrolyte Solution for Electric Double-Layer Capacitors The conductivities (mS/cm) at 20° C. and −30° C. and the potential windows (V) of the electrolyte solutions for capacitors prepared in examples and comparative examples were measured. The conductivities were measured using "LCR HiTESTER 3532-50" produced by HIOKI E.E. CORPORATION, and the potential windows were determined by measuring oxidation decomposition potential and reduction decomposition potential from a voltage range in which a current density of not more than 0.2 mA/cm$^2$ was measured at a sweep rate of 5 mV/s using "electrochemical analyzer Model 1660C" produced by ALS. In the measurement, a glass carbon working electrode (diameter 1.7 mm), a platinum wire counter electrode, and a Ag/Ag$^+$ reference electrode were used. Table 2 shows the results. In Table 2, EMS represents ethyl methyl sulfone, EIPS represents ethyl isopropyl sulfone, and EIBS represents ethyl isobutyl sulfone.

TABLE 2

| | Electrolyte solution composition | | | | | | Conductivity (mS/cm) | | Potential window |
|---|---|---|---|---|---|---|---|---|---|
| | Chain alkyl sulfone compound represented by formula (1) | | | | | Propylene | | | |
| | EMS | EIPS | EIBS | Acetonitrile | Sulfolane | carbonate | 20° C. | −30° C. | (V) |
| Example 1 | 80 | — | — | 20 | — | — | 9.3 | 1.7 | +2.5 to −3.2 |
| Example 2 | — | 16 | — | 20 | 64 | — | 10.1 | 2.0 | +2.3 to −3.2 |
| Example 3 | 18 | — | — | 10 | 72 | — | 9.3 | 0.8 | +2.3 to −3.2 |
| Example 4 | 20 | — | — | 20 | 60 | — | 11.4 | 2.2 | +2.3 to −3.2 |
| Example 5 | 60 | 20 | — | 20 | — | — | 10.5 | 2.1 | +2.6 to −3.3 |
| Example 6 | 70 | — | — | 30 | — | — | 18.2 | 4.6 | +2.5 to −3.2 |
| Example 7 | — | 70 | — | 30 | — | — | 15.7 | 3.7 | +2.5 to −3.2 |
| Example 8 | — | — | 70 | 30 | — | — | 15.1 | 3.4 | +2.5 to −3.2 |
| Example 9 | — | 95 | — | 5 | — | — | 5.6 | 0.6 | +2.5 to −3.2 |
| Example 10 | — | 20 | — | 80 | — | — | 33.8 | 19.5 | +2.6 to −3.2 |
| Comparative Example 1 | — | — | — | 100 | — | — | 53.1 | 28.0 | +2.6 to −3.2 |
| Comparative Example 2 | 100 | — | — | — | — | — | 4.1 | Coagulated | +2.6 to −3.3 |
| Comparative Example 3 | — | — | — | — | — | 100 | 11.7 | 1.1 | +1.8 to −3.2 |
| Comparative Example 4 | — | — | — | — | 100 | — | 2.7 | Coagulated | +2.3 to −3.2 |
| Comparative Example 5 | — | 80 | — | — | 20 | — | 4.5 | Coagulated | +2.3 to −3.2 |

※The electrolyte solution for capacitors obtained in Comparative Example 1 is highly volatile, and therefore needs to be used and stored at a temperature of 25° C. or lower for suppression of volatilization.

(2) Measurement of Properties of Electric Double-Layer Capacitor

Electric double-layer capacitors were prepared using the electrolyte solutions for capacitors prepared in examples and comparative examples in the following way.

ment of the electrostatic capacity in such a way that a rated voltage of 2.5 V was applied to the capacitor for 30 min and the capacitor was discharged at a constant current of 100 mA, and the internal resistance was calculated by IR drop. Table 3 shows the results.

TABLE 3

| | Electrolyte solution composition | | | | | | Electrostatic capacity (F) | | Internal resistance (Ω) | |
|---|---|---|---|---|---|---|---|---|---|---|
| | Chain alkyl sulfone compound represented by formula (1) | | | | | Propylene | | | | |
| | EMS | EIPS | EIBS | Acetonitrile | Sulfolane | carbonate | 20° C. | −30° C. | 20° C. | −30° C. |
| Example 1 | 80 | — | — | 20 | — | — | 0.41 | 0.34 | 11.0 | 38 |
| Example 2 | — | 16 | — | 20 | 64 | — | 0.42 | 0.33 | 12.9 | 41 |
| Example 3 | 18 | — | — | 10 | 72 | — | 0.43 | 0.33 | 11.1 | 101 |
| Example 4 | 20 | — | — | 20 | 60 | — | 0.44 | 0.35 | 9.0 | 45 |
| Example 5 | 60 | 20 | — | 20 | — | — | 0.42 | 0.33 | 11.8 | 43 |
| Example 6 | 70 | — | — | 30 | — | — | 0.48 | 0.37 | 5.8 | 21 |
| Example 7 | — | 70 | — | 30 | — | — | 0.46 | 0.35 | 6.9 | 25 |
| Example 8 | — | — | 70 | 30 | — | — | 0.45 | 0.35 | 7.1 | 29 |
| Example 9 | — | 95 | — | 5 | — | — | 0.44 | 0.34 | 15.8 | 93 |
| Example 10 | — | 20 | — | 80 | — | — | 0.48 | 0.42 | 3.5 | 4.9 |
| Comparative Example 1 | — | — | — | 100 | — | — | 0.50 | 0.45 | 2.0 | 3.4 |
| Comparative Example 2 | 100 | — | — | — | — | — | 0.42 | Coagulated | 22.0 | Coagulated |
| Comparative Example 3 | — | — | — | — | — | 100 | 0.48 | 0.33 | 9.1 | 88 |
| Comparative Example 4 | — | — | — | — | 100 | — | 0.41 | Coagulated | 28.0 | Coagulated |
| Comparative Example 5 | — | 80 | — | — | 20 | — | 0.42 | Coagulated | 21.5 | Coagulated |

※The electrolyte solution for capacitors obtained in Comparative Example 1 is highly volatile, and therefore needs to be used and stored at a temperature of 25° C. or lower for suppression of volatilization.

Two 0.1 mm-thick aluminum sheets having a 14 mm-diameter circular shape coated with activated carbon were used as polarizing electrodes disposed to face each other, and a 0.05 mm-thick cellulose separator having a 17 mm-diameter circular shape was disposed between the aluminum sheets. These were housed in an stainless steel outer container (diameter 20 mm, height 3.2 mm, thickness of stainless steel 0.25 mm) equipped with a polypropylene gasket, and impregnated with an electrolyte solution for capacitors. The container was engaged with a crimping machine to prepare a CR2032 size coin-shaped electric double-layer capacitor.

The characteristics of the prepared electric double-layer capacitors were determined through the charge-discharge test at 20° C. and −30° C. Specifically, each capacitor was allowed to stand for not less than 30 min under the given measurement temperature to adjust the temperature of the capacitor to the given temperature, a rated voltage of 2.5 V was applied to the capacitor for 30 min, and the capacitor was discharged at a constant current of 2 mA. The time until the voltage between the capacitor terminals reaches from 2 V to 1 V was measured to determine an electrostatic capacity. The lower limit of the discharge voltage was 0.0 V. The internal resistance was determined similarly to the measure- Tables 2 and 3 show that the capacitors using the electrolyte solutions for capacitors of the examples in which a solvent mixture containing acetonitrile is used function even at low temperatures, and the electric double-layer capacitors using such electrolyte solutions have sufficient electrostatic capacity even at low temperatures.

INDUSTRIAL APPLICABILITY

The present invention can provide a highly conductive, highly voltage-resistant, and stable liquid electrolyte solution for capacitors which does not coagulate and is free from precipitation of salts in a wide temperature range, particularly at low temperatures, shows excellent electrical characteristics, and has excellent long-term reliability. The present invention can also provide an electric double-layer capacitor and a lithium ion capacitor produced using the electrolyte solution for capacitors.

The invention claimed is:
1. A lithium ion capacitor produced using an electrolyte solution comprising:
   an organic solvent; and
   a quaternary ammonium salt or lithium salt dissolved in the organic solvent, the organic solvent containing acetonitrile, a chain alkyl sulfonic compound represented by the formula (1), and sulfolane represented by the formula (2):

(1)

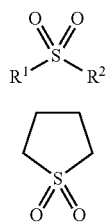
(2)

wherein $R^1$ and $R^2$, which may be the same as or different from each other, each independently represents a straight or branched chain C1-C4 alkyl group.

2. A lithium ion capacitor produced using an electrolyte solution comprising:
an organic solvent; and
a quaternary ammonium salt or lithium salt dissolved in the organic solvent, the organic solvent containing acetonitrile and a chain alkyl sulfonic compound represented by the formula (1):

(1)

wherein $R^1$ and $R^2$, which may be the same as or different from each other, each independently represents a straight or branched chain C1-C4 alkyl group.

* * * * *